United States Patent [19]
Coyle, Jr. et al.

[11] Patent Number: 5,220,665
[45] Date of Patent: Jun. 15, 1993

[54] METHOD AND SYSTEM FOR SUPPORTING CONCURRENT USE DURING SEQUENTIAL BATCH APPLICATIONS UTILIZING PERSISTENT CURSORS

[75] Inventors: Dan J. Coyle, Jr., Austin, Tex.; Bruce G. Lindsay, San Jose, Calif.

[73] Assignee: International Business Machines Corporation, Armonk, N.Y.

[21] Appl. No.: 516,363

[22] Filed: Apr. 30, 1990

[51] Int. Cl.$^5$ .................... G06F 7/00; G06F 15/40; G06F 15/403
[52] U.S. Cl. ................ 395/650; 364/DIG. 2; 364/974; 364/974.6; 364/963
[58] Field of Search ........ 364/27.61, DIG. 1, DIG. 2

*Primary Examiner*—Gareth D. Shaw
*Assistant Examiner*—A. Katbab
*Attorney, Agent, or Firm*—Andrew J. Dillon

[57] ABSTRACT

A method is disclosed for supporting sequential batch applications within a data processing system which permits the continued enumeration of a sequence of objects across a transaction commit, roll-back or system failure. A query is defined which specified a set of objects and a named cursor is associated with the query, each cursor including at least one scan which may be utilized to evaluate and enumerate the query. Selected cursors may be designated as persistent cursors and stored, along with the state of any associated scan(s) and a query evaluation state in a persistent cursor table (PCT) in response to a transaction commit. Thereafter, the evaluation and enumeration of the query may be reestablished at the point of a persistent cursor by utilizing the information stored within the persistent cursor table (PCT). In the event of a subsequent rollback of a transaction prior to the next commit point the query may be reestablished at the previous commit point utilizing the information stored within the persistent cursor table (PCT). A cursor may also be designated as a restartable cursor and stored, along with all information within the persistent cursor table (PCT), in non-volatile memory. Thereafter, in the event of a system failure the evaluation and enumeration of the query may be reestablished at the point of a restartable cursor by utilizing the information stored within non-volatile memory.

4 Claims, 7 Drawing Sheets

PERSISTENT CURSOR TABLE

| | |
|---|---|
| 50 — CURSOR NAME 1 | CURSOR STATE 1 — 52 |
| 54 — CURSOR NAME 2 | CURSOR STATE 2 — 56 |
| ⋮ | |
| 58 — CURSOR NAME K | CURSOR STATE K — 60 |

OPEN CURSOR TABLE

| | | |
|---|---|---|
| 64 — CURSOR NAME 1 | QUERY EXEC. STATE | — 66 |
| 68 — CURSOR NAME 2 | QUERY EXEC. STATE | — 70 |
| ⋮ | | |
| 72 — CURSOR NAME K | QUERY EXEC. STATE | — 74 |

62

76
- SCANS
  - TABLE ID
  - ENTRY KEY
- BUFFERS
- STATE FLAGS
- PLAN DESCRIPTION
- TEMPORARY TABLES
- FREE VARIABLE VALUES

*Fig. 5*

METHOD AND SYSTEM FOR SUPPORTING CONCURRENT USE DURING SEQUENTIAL BATCH APPLICATIONS UTILIZING PERSISTENT CURSORS

BACKGROUND OF THE INVENTION

1. Field of the Invention

The present invention relates in general to the field of database applications and in particular to the field of database applications which support sequential batch applications. Still more particularly the present invention relates to database applications which support sequential batch applications and permit the continued evaluation and enumeration of a sequence of objects across a transaction commit, roll-back or system failure.

2. Description of the Prior Art

The storage and manipulation of data records or objects within a database application is well known in the prior art. As database applications have become larger and more complex a problem has arisen with regard to the need to apply application processing operations to a large set of data objects.

In database applications the objects which require processing are specified utilizing a non-procedural, relational calculus expression known as a "query." A named "cursor" may be associated with a query and utilized to evaluate and enumerate the query by operations known as "open" and "fetch." Typically, a plan is generated and utilized to map these cursor operations to lower level operations which operate on single relations within the database.

Examples of lower level operations include "scans" and the creation of so-called "temporary relations." Scans are enumerators over sequential access paths of single relations. An access path may comprise a sequential access scan through the records of a table in physical or numerical order, or an index scan through the keys of an index. A temporary relation contains or buffers those intermediate results which are utilized by the query plan in the construction of the query result set.

At any given time the state of an active cursor in a database application is embodied in the state of any associated temporary relations and the position of one or more access path scans. Cursor state also includes control status which may be utilized to track the progress of the query plan. In most database applications cursors are closed at the termination of a transaction. That is, upon the achievement of a state of atomicity a transaction may "commit" and release all underlying scans, temporary relations and locks associated with all cursors rendering any changes permanent. Similarly, if a transaction is terminated prior to achieving atomicity, the state of all activities therein will be "rolled-back", utilizing temporary log entries, to return the database to the previous state of atomicity represented by the last "commit."

As a result of the necessity of maintaining the atomicity of a database, a problem exists when a large number of operations must be processed. Under systems known in the prior art the entire number of records to be processed must be "locked" and maintained in that condition until all processing is complete. While this method permits some assurances that a large number of operations may be successfully accomplished, concurrent access to those records by others is prohibited during such operations.

As a result of the above several systems have been proposed in an attempt to permit the processing of a large batch of records without disrupting real time, on-line transaction processing. For example, a mechanism known as "Commit Hold" has been proposed which allows a database application to hold the locks associated with selected scans across a transaction boundary. However, there exists no method specified within this system which permits the application to specify which scans should be held. More seriously, scan positions in this system are lost in the event of a transaction roll-back. Since a roll-back may be initiated by the system without operator input the "Commit Hold" system is not generally useful.

In "Consistency of Transactions and Random Batch", ACM Transactions on Database Systems, Volume 11, Number 4, Dec. 1986, a system was proposed which constrains the ordering of batch application accesses relative to the accesses of on-line applications. This method ensures serializable execution for all involved; however, it requires a very careful synchronization between batch and on-line applications. A failure in the synchronization area within this system may result in a roll-back in either the batch or on-line application.

In View of the above it should be clear that a need exists for a database application system which permits the processing of large numbers of objects without disrupting real time, on-line transaction processing by allowing the batch application to frequently commit updates and release locks while continuing to process a set of objects defined by a query.

SUMMARY OF THE INVENTION

It is therefore one object of the present invention to provide an improved database application.

It is another object of the present invention to provide an improved database application which supports sequential batch applications.

It is yet another object of the present invention to provide an improved database application which supports sequential batch applications and which permits the continued evaluation and enumeration of a sequence of objects across a transaction commit, roll-back or system failure.

The foregoing objects are achieved as is now described. The method of the present invention defines a query which specifies a set of objects. A named cursor is associated with that query, each cursor including at least one scan which may be utilized to evaluate and enumerate the query. Selected cursors may be designated as persistent cursors and stored, along with the state of any associated scan(s) and a query evaluation state in a persistent cursor table (PCT) in response to a transaction commit. Thereafter, the evaluation and enumeration of the query may be reestablished at the point of a persistent cursor by utilizing the information stored within the persistent cursor table (PCT). In the event of a subsequent roll-back of a transaction prior to the next commit point the query may be reestablished at the previous commit point utilizing the information stored within the persistent cursor table (PCT). A cursor may also be designated as a restartable cursor and stored, along with all information within the persistent cursor table (PCT), in non-volatile memory. Thereafter, in the event of a system failure the evaluation and enumeration of the query may be reestablished at the point of a restartable cursor by utilizing the information stored within non-volatile memory. In a preferred embodiment of the present invention an instance identifier parameter is stored in association with each restartable cursor so that multiple applications may concurrently utilize a single restartable cursor.

The above as well as additional objects, features, and advantages of the invention will become apparent in the following detailed description.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 4 depicts a pictorial representation of a persistent cursor table (PCT) established in accordance with the method of the present invention;

FIG. 5 depicts a pictorial representation of an open cursor table established in accordance with the method of the present invention;

DETAILED DESCRIPTION OF THE INVENTION

Figure 1:
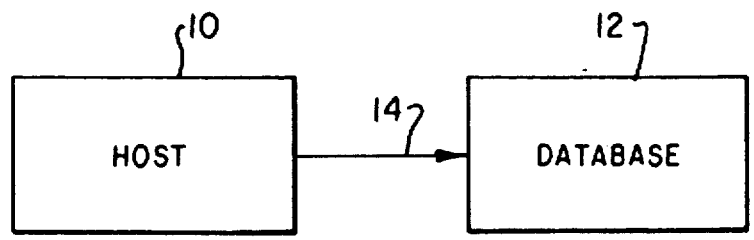
FIG. 1 depicts a pictorial representation of a host computer and database which may be utilized to implement the method of the present invention.

With reference now to the FIGS. and in particular with reference to FIG. 1, there is depicted a pictorial representation of a host computer 10 and a database 12. As is illustrated, host computer 10 is coupled to database 12 via communications link 14; however, those ordinarily skilled in the art will appreciate that database 12 may indeed be stored within the internal storage media of host computer 10. Similarly, host computer 10 may also comprise any server device having access to a database.

Figure 2:
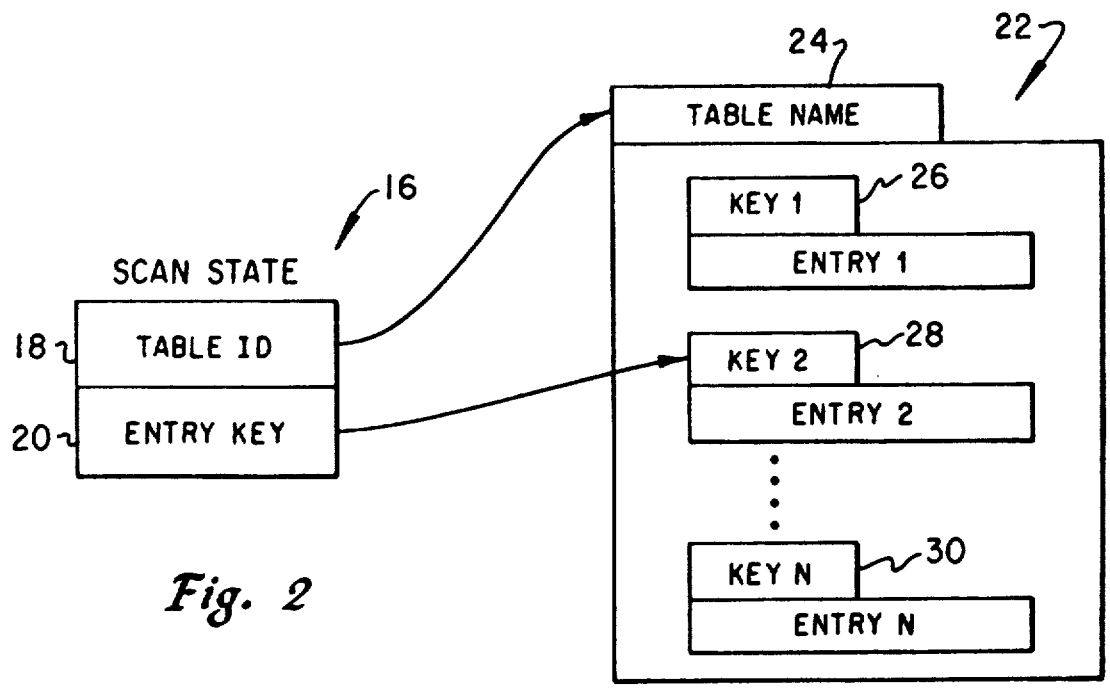
FIG. 2 depicts a pictorial representation of a data table and an associated scan for sequentially accessing said data table.

Referring now to FIG. 2, there is depicted a pictorial representation of a data table 22 and an associated scan state 16 for sequentially accessing data table 22. As those skilled in the art will appreciate a scan is an enumerator over a sequential access path of single relations. An access path may comprise a sequential access scan through the records of a table in physical order or an index scan through the keys of an index. As is illustrated, scan state 16 includes two fields. Namely, field 18 in which the identification of the table from which data is required is listed. Additionally, field 20 includes an identification of the entry key at which the current entry will be located. As is illustrated, field 18 is utilized to refer to a specific table name, as stored within field 24 of data table 22 and entry key field 20 is utilized to refer to one of the specific keys stored within data table 22.

Figure 3:
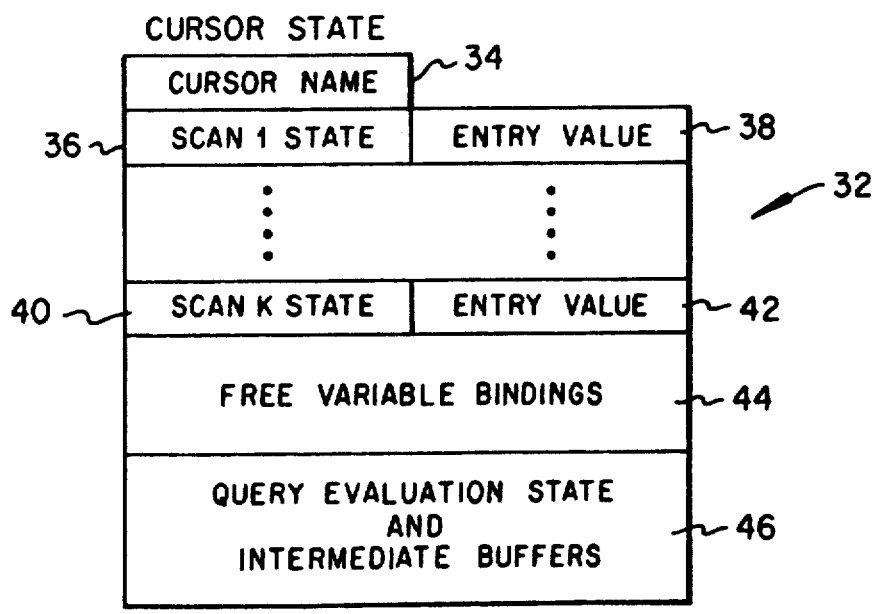
FIG. 3 depicts a pictorial representation of a cursor state which may be utilized in accordance with the method of the present invention.

With reference now to FIG. 3 there is depicted a pictorial representation of a cursor state 32. As is illustrated, the state of an active cursor in a database application is embodied in the state of any associated temporary relations and the position of one or more access path scans. As depicted, the pictorial representation of cursor state 32 includes a field 34 wherein the name of the particular cursor is listed. Additionally, the state of each of a plurality of scans 36–40 is also listed therein, along with the entry value returned by each scan, at reference numerals 38 and 42 respectively. Additionally, field 44 represents the free variable bindings and field 46 depicts the evaluation state of the query associated with the named cursor and the value for any intermediate results which are stored within buffers associated with the named cursor.

Referring now to FIG. 4 there is, in accordance with an important feature of the present invention, depicted a pictorial representation of a persistent cursor table (PCT) which has been established in accordance with the method disclosed herein. As is illustrated, persistent cursor table (PCT) 48 includes a listing of all cursors which have been designated as persistent, in accordance with the method of the present invention. As illustrated, this may include multiple cursors 50, 54 and 56, each of which has been stored in association with those values which embody the state of that named cursor, as discussed above with respect to cursor state 32 (see FIG. 3).

That is, each named cursor within persistent cursor table (PCT) 48 has stored therewith a plurality of fields including those values set forth in the pictorial representation of a cursor state 32. For example, cursor name field 50 has associated therewith a cursor state field 52. Similarly, cursor name field 54 has associated therewith a cursor state field 56 and cursor name field 58 has associated therewith a cursor state field 60. In this manner, each cursor which has been designated as a persistent cursor, that is a cursor which may be utilized to continue to enumerate a sequence of data objects following a transaction termination, is stored within persistent cursor table (PCT) 48 along with sufficient state and temporary relation information to enable the cursor to be reestablished following a transaction termination. Additionally, as will be explained in greater detail herein, the contents of persistent cursor table (PCT) 48 for any cursor which has been designated as "restartable" will be stored within non-volatile memory so that a selected position associated therewith may be efficiently reestablished following a system failure. Of course, those skilled in the art will appreciate that the storage of the contents of persistent cursor table (PCT) 48 in non-volatile memory must be accomplished in a transaction boundary synchronized manner such that the failure of the application to achieve a state of atomicity will result in a roll-back of any data stored therein.

With reference now to FIG. 5 there is depicted a pictorial representation of an open cursor table 62 which has been established in accordance with the method of the present invention. Open cursor table 62 is utilized, in accordance with the method disclosed herein, to list the cursor for each selected query which is open at any given time during the processing of that query. As is illustrated, a plurality of named cursors 64, 68 and 72 are listed, along with an associated query execution state for each such cursor. That is, named cursor 64 has associated therewith a query execution state 66. Similarly, named cursor 68 has associated therewith a query execution state 70 while named cursor 72 has associated therewith a query execution state 74. As illustrated at reference number 76, each query execution state preferably includes information regarding the state of an associated scan, including the identification of the table and the entry key which is required to return the entry value desired. Further, the contents of any temporary buffers along with state flags and a description of the plan for materializing the query result set are also stored. Additionally, the values stored within any temporary tables and the free variable values are also stored in association with the query execution state for a named cursor within open cursor table 62. In this manner, the database system may simply refer to open cursor table 62 in order to determine the execution state of a query associated with a selected named cursor.

Figure 6:
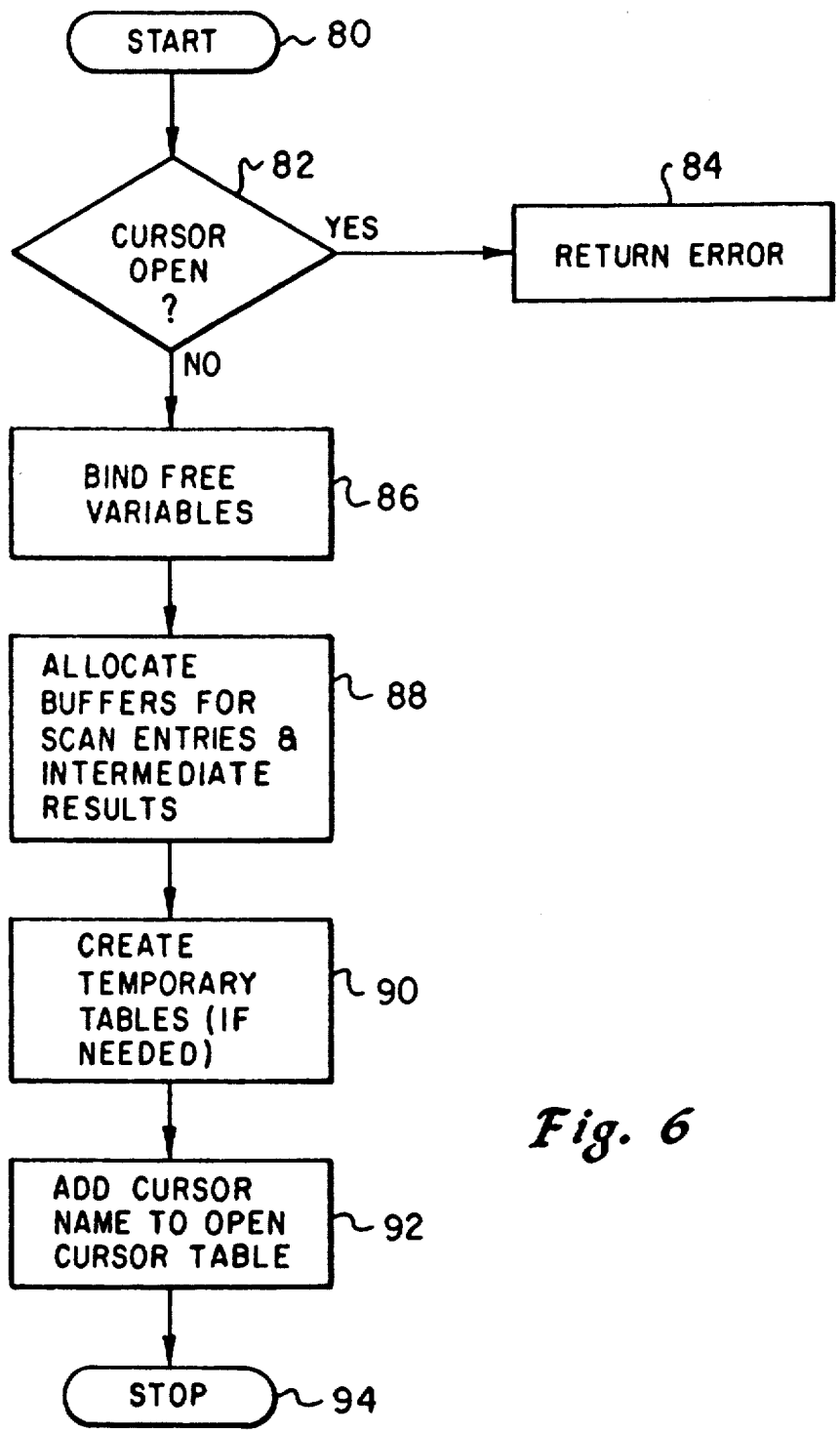
FIG. 6 is a high level flowchart depicting the opening of a persistent cursor in accordance with the method of the present invention.

Referring now to FIG. 6 there is depicted a high level flowchart which illustrates the opening of a persistent cursor in accordance with the method of the present invention. As is illustrated, the process begins at block 80 and thereafter passes to block 82 wherein a determination is made as to whether or not the named cursor is already open. Of course, those skilled in the art will appreciate that this determination may be simply and easily made by referring to open cursor table 62 (see FIG. 5) in order to determine whether or not the named cursor is listed therein. In the event the named cursor is already open then block 84 illustrates the returning of an error message to the user.

After determining that the named cursor in question is not already open, as illustrated in block 82, block 86 illustrates the binding of the free variables associated with that cursor. Next, block 88 illustrates the allocation of buffers for scan entries and any intermediate results which may be generated while materializing the query result set.

Block 90 next illustrates the creation of any temporary tables which may be needed to materialize the query result set and block 92 depicts the adding of the named cursor to the open cursor table, as illustrated in FIG. 5. Thereafter, the process terminates as illustrated in block 94.

Figure 7:
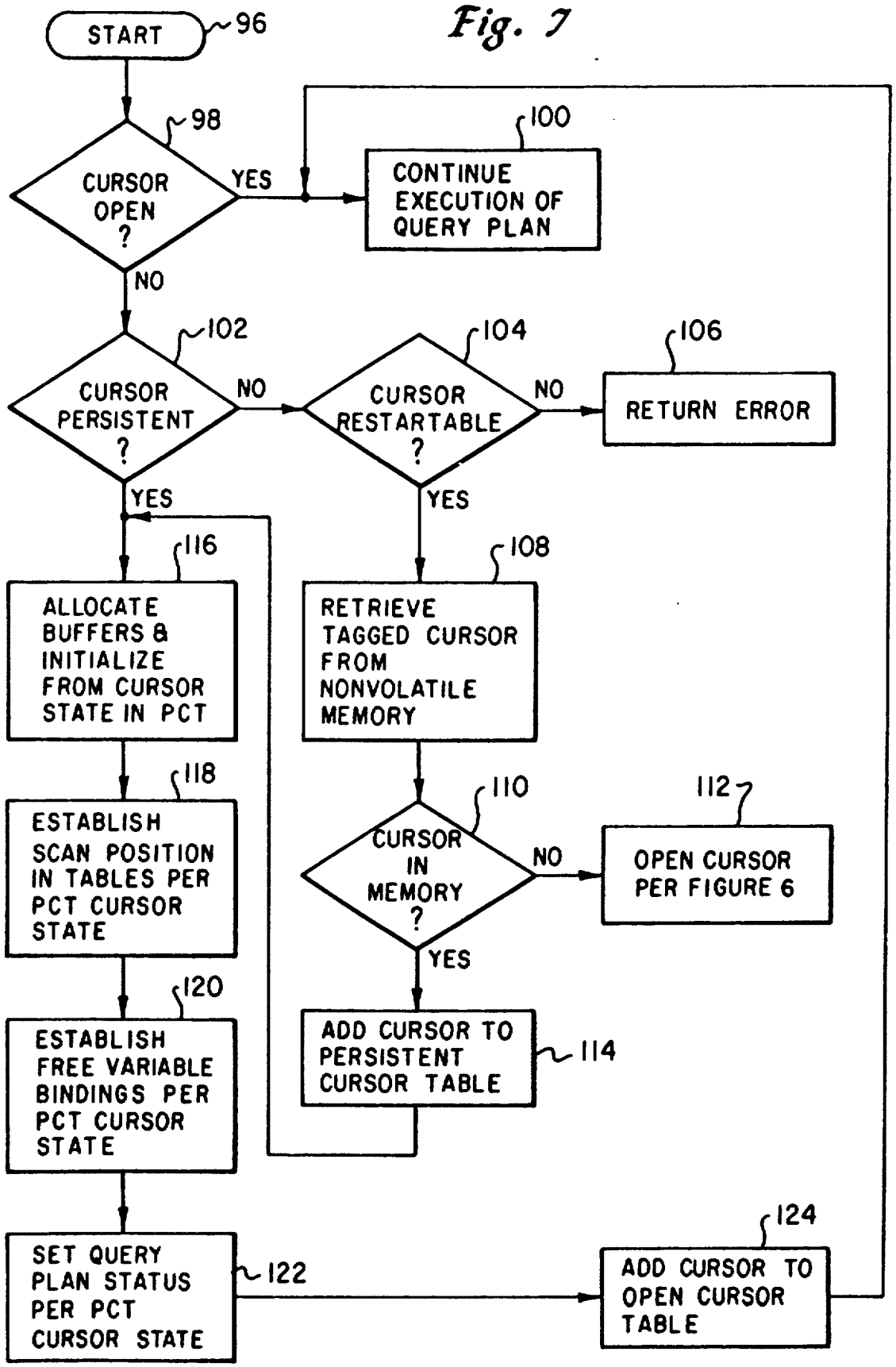
FIG. 7 is a high level flowchart depicting the fetching of an entry by means of a persistent and/or restartable cursor in accordance with the method of the present invention.

With reference now to FIG. 7 there is depicted a high level flowchart which illustrates the fetching of an entry by means of a persistent and/or restartable cursor, in accordance with the method of the present invention. As depicted, this process begins at block 96 thereafter passes to block 98 wherein a determination is made whether or not the named cursor is an open cursor. As discussed above, this process may be implemented by a simple referral to the open cursor table depicted within FIG. 5. If the named cursor is open, that cursor is utilized to continue execution of the query plan, as depicted in block 100 However, in the event the named cursor is not open, block 102 illustrates a determination of whether or not the cursor in question is a persistent cursor. That is, a cursor which may be reestablished following a transaction termination due to a commit or a roll-back.

In the event the named cursor has not been designated as a persistent cursor, as determined in block 102, then block 104 illustrates a determination of whether or not the named cursor is a restartable cursor. As utilized herein, a "restartable" cursor shall mean a cursor which may be reestablished, utilizing the method of the present invention, following a system failure. If the named cursor is neither persistent nor restartable an error message is returned to the user indicating that the continued execution of the query plan is not possible, as illustrated in block 106.

If, as determined in block 104, the named cursor is a restartable cursor, block 108 illustrates the retrieving of the tagged cursor from non-volatile memory. As will be discussed in greater detail herein, an instance identifier is preferably stored within non-volatile memory in association with each restartable cursor so that a restartable cursor may be concurrently utilized by multiple applications. Next, block 110 depicts a determination of whether or not the restartable cursor has been found within non-volatile memory storage and if not, the named cursor must be opened, as depicted in block 112, in the manner previously illustrated with regard to FIG. 6.

However, in the event the restartable cursor has been located within non-volatile memory storage, as determined by block 110, then block 114 illustrates the adding of this cursor to the persistent cursor table (PCT). Of course, those skilled in the art will appreciate that as defined herein any cursor which is designated as restartable will also be persistent. The converse is, of course, not true since a persistent cursor, as defined herein, may not be reestablished following a system failure, since the state of a persistent cursor will not be stored within non-volatile memory, in the manner which will be described herein.

After adding the named cursor to the persistent cursor table (PCT), as illustrated in block 114, the process returns to block wherein the allocation of any required buffers is accomplished and all associated values are initialized from the information regarding the named cursor state which has been stored within the persistent cursor table (PCT).

Thereafter, block 118 illustrates the establishment of scan positions for the cursor in accordance with the scan position information contained within persistent cursor table (PCT) 48 (see FIG. 4). Thereafter, block 120 depicts the establishment of the free variable bindings in accordance with the cursor state information stored within persistent cursor table (PCT) 48. Finally, block 122 depicts the setting of the query plan status in accordance with the information stored within persistent cursor table (PCT) 48 under the heading of cursor state information.

Upon reference to the foregoing those skilled in the art will appreciate that during the execution of a query plan if a named cursor is not listed within the open cursor table it may be accurately and efficiently reestablished utilizing the information which has been stored, in accordance with the method of the present invention, within persistent cursor table (PCT) 48, as illustrated in FIG. 4 herein. Finally, after reestablishing persistent cursor table (PCT) 48 so that the enumeration of data objects within the query plan may be continued, block 124 illustrates the addition of the named cursor to the open cursor table. Thereafter, as illustrated in block 100 of FIG. 7 the continued execution of the query plan is carried out.

Figure 8:
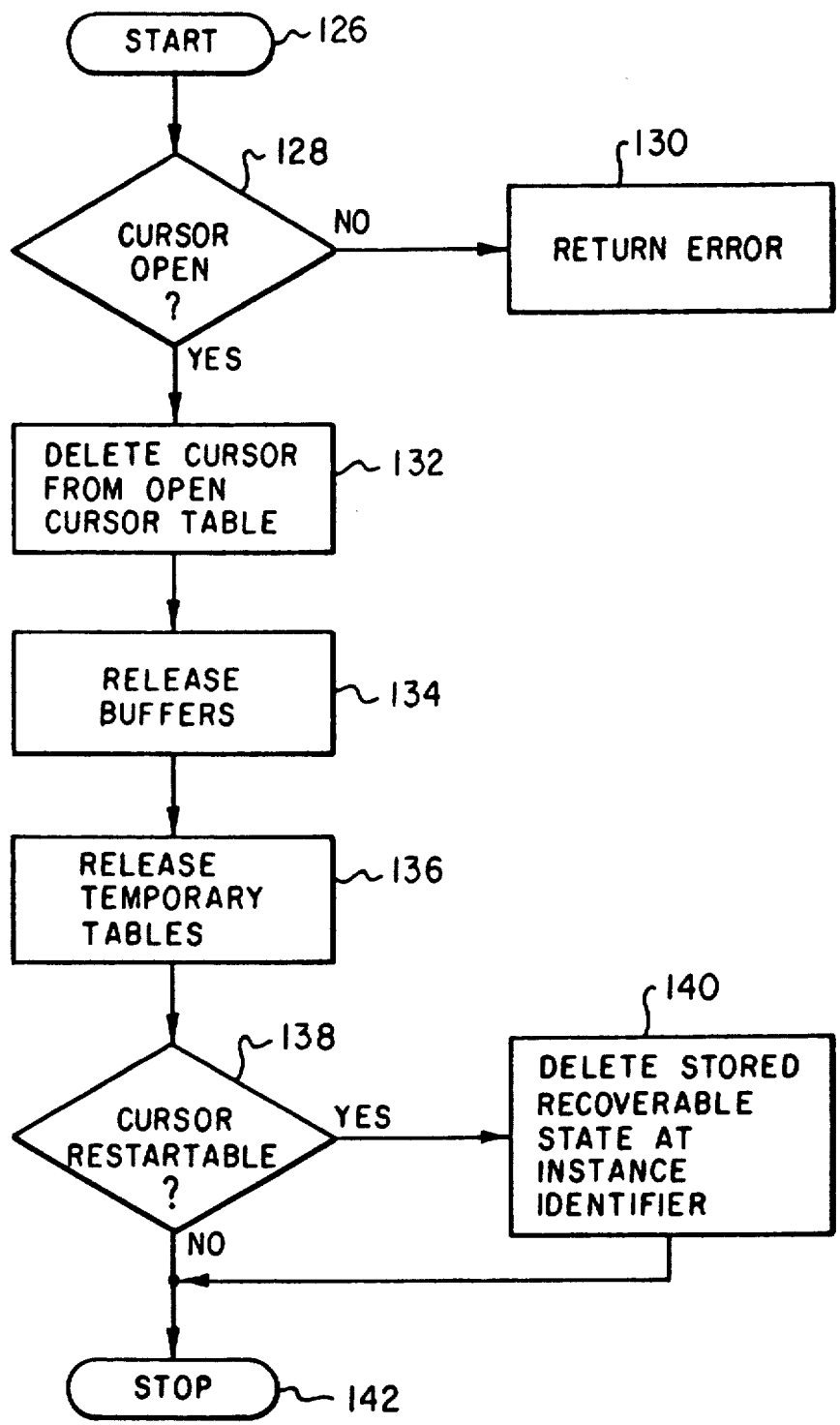
FIG. 8 is a high level flowchart depicting the closing of a persistent and/or restartable cursor in accordance with the method of the present invention.

Referring now to FIG. 8, there is depicted a high level flowchart which illustrates the closing of a persistent and/or restartable cursor in accordance with the method of the present invention. As above, this process begins at block 126 and thereafter passes to block 128 wherein a determination is made as to whether or not the named cursor is open. As discussed above, this process may be accomplished by simply referring to the open cursor table (see Figure 5). In the event the named cursor is not listed within the open cursor table, block 130 illustrates the returning of an error message to the user indicating that the cursor may not be closed, since it is not open.

In the event the named cursor is listed within the open cursor table, as determined within block 128, block 132 illustrates the deletion of the named cursor from the open cursor table. Next, block 134 illustrates the releasing of any associated buffers and similarly, block 136 illustrates the releasing of those temporary tables which may have been associated with the named cursor.

Next, block 138 illustrates a determination of whether or not the named cursor is a restartable cursor. That is, a cursor which has had the contents of persistent cursor table (PCT) 48 stored within non-volatile memory so that it may be reestablished following a system failure. If so, block 140 illustrates the deletion of the stored recoverable state for that cursor at the instance identifier associated with this particular application. Thereafter, or in the event the named cursor is not a restartable cursor, as determined at block 138, the process terminates, as depicted at block 142.

Figure 9:
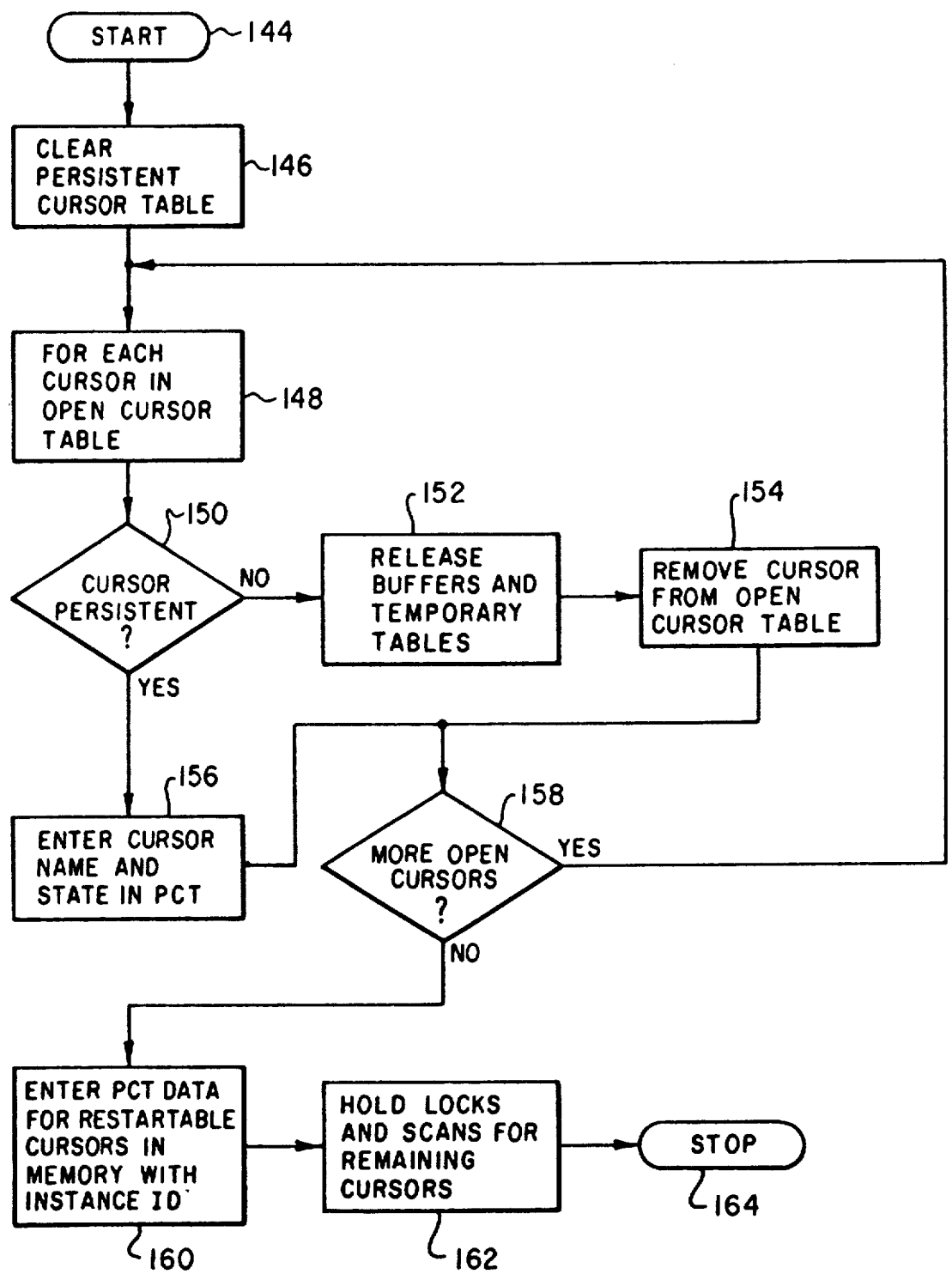
FIG. 9 is a high level flowchart depicting the treatment of a persistent and/or restartable cursor in the event of a transaction commit, in accordance with the method of the present invention.

With reference now to FIG. 9 there is depicted a high level flowchart illustrating the treatment of a persistent and/or restartable cursor in the event of a transaction commit, in accordance with the method of the present invention. As above, the process begins the treatment of any associated cursor upon the occurrence of a transaction commit at block 144 and thereafter passes to block 146 Which depicts clearing of persistent cursor table (PCT) 48, as depicted above in FIG. 4.

Thereafter, for each cursor within the open cursor table, as illustrated in block 148, a determination is made as to whether or not a particular cursor is a persistent cursor, as depicted in block 150. In the event the named cursor currently under process is not a persistent cursor, block 152 depicts the releasing of any associated buffers and temporary tables which are associated with the named cursor. Next, block 154 depicts the removal of the named cursor from the open cursor table and the process then passes to block 158 for a determination of whether or not any additional open cursors exist. If so, the process returns iteratively to block 148 to process the next cursor within the open cursor table.

In the event a particular cursor under process has been determined to be a persistent cursor, as illustrated in block 150, the process passes to block 156 wherein the name of that selected cursor and all information associated with its state are entered into persistent cursor table (PCT) 48, in the manner illustrated in FIG. 4. Thereafter, the process also passes to block 158 for a determination of whether or not any additional open cursors exist.

Upon reference to the foregoing of those skilled in the art will appreciate that upon a transaction commit persistent cursor table (PCT) 48 is cleared and then each cursor within the open cursor table is examined. Those cursors which are not designated as persistent are removed from the open cursor table and any associated buffers or temporary tables are also released. However, those cursors which have been previously designated as persistent are reentered into persistent cursor table (PCT) 48 and the process continues in an iterative fashion.

Once the determination depicted within block 158 has revealed that no more open cursors remain within the open cursor table, the process passes to block wherein the data within persistent cursor table (PCT) 48 for each cursor which has been designated as restartable is stored within non-volatile memory, along with an instance identifier which, as discussed herein, may be utilized to permit a restartable cursor to be concurrently utilized by multiple applications. Finally, block 162 illustrates the holding of any locks or scans associated with the remaining cursors and the process terminates, as depicted in block 164.

Figure 10:
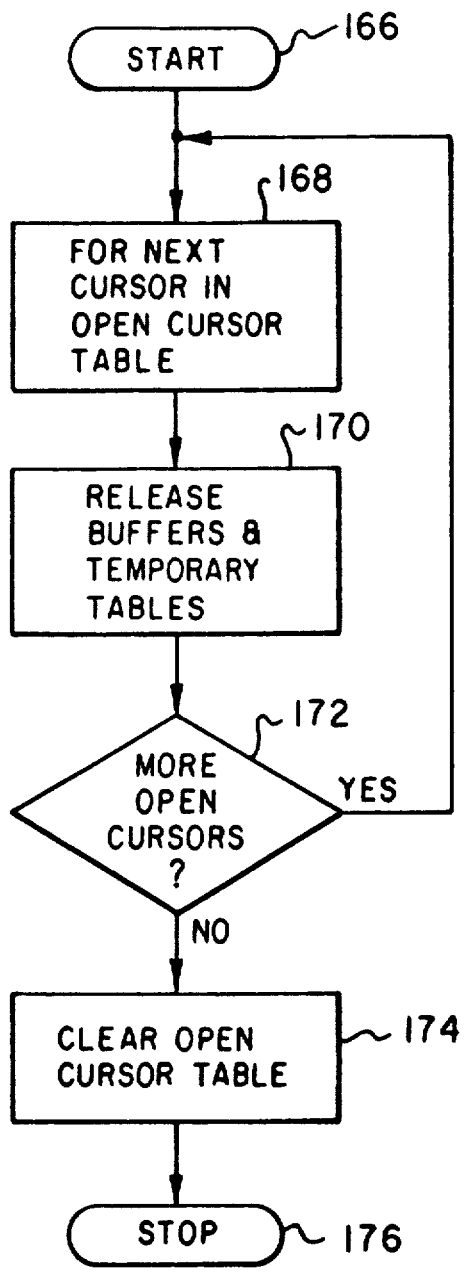
FIG. 10 is a high level flowchart depicting the treatment of a persistent and/or restartable cursor in the event of a transaction roll-back in accordance with the method of the present invention.

Finally, referring now to FIG. 10 there is depicted a high level flowchart which illustrates the treatment of a persistent and/or restartable cursor in the event of a transaction roll-back, in accordance with the method of the present invention. As above, the process begins at block 166 thereafter passes to block 168 which illustrates the iterative nature of this process for each cursor within the open cursor table. Block 170 then depicts the releasing of any buffers and temporary tables associated with each cursor within the Open Cursor table. Next, block 172 illustrates a determination of whether or not any additional open cursors exist within the open cursor table and if so, the process returns iteratively to block 168 to continue the process. After all open cursors have been processed as discussed above, block 174 depicts the clearing Of the open cursor table and the process terminates, as illustrated in block 176.

Upon reference to the foregoing those skilled in the art will appreciate that the applicants have described herein a method whereby a cursor utilized to evaluate and enumerate a database query may be designated as persistent and/or restartable such that the enumeration of a selected set of data objects may be continued following a transaction commit, roll-back or a system failure.

The first fetch operation following a transaction commit may be utilized to reestablish the scan positions for a selected cursor, utilizing the saved scan position information within persistent cursor table (PCT) 48. In addition, prior to reestablishing scan positions the "currency" of the database physical schema for the relations and access paths of the saved scans must be validated. Database schema changes may prevent re-establishing cursor position if the relation or the access path being used has been destroyed. Schema "currency" may be tested utilizing schema version identifiers which are also saved along with scan position, or by retaining locks which prevent schema modification.

The scan positions which are saved in accordance with the method disclosed herein are also retained during transaction processing to allow repositioning of the scans and cursors following a transaction roll-back. After a transaction roll-back, the "old" saved state for the cursor may be utilized to reestablish the cursor position. Locks may not be utilized to validate schema "currency" following a transaction roll-back.

The information which is needed to reestablish scan positions for a persistent or restartable cursor must include, besides a schema validation token, the identity of the last record processed by a scan. This value may be utilized to reposition the scan at the last record processed or following the last records processed in the event the last record processed was deleted by the batch application or some other database application. Of course, an implementation optimization which retains locks which "stabilize" the record at the current scan position may be utilized to avoid repositioning overhead for committed transactions. Transaction roll-back will always require explicit repositioning and schema "currency" validation.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. A method in a data processing system for enhanced efficiency in concurrent use database applications which process application specified sequences of objects by utilizing a plurality of queries which each specify a set of objects and a named cursor associated with each of said plurality of queries, each of said named cursors including at least one scan which may be utilized to evaluate and enumerate an associated query, said method comprising the data processing system steps of:

permitting a user to designate within said data processing system at least one of said named cursors as a persistent cursor;

storing a status of each persistent cursor in a persistent cursor table within said data processing system along with a state of any included scan and a query evaluation state in response to a commit operation within said data processing system;

closing all cursors in response to said commit operation within said data processing system; and reestablishing a plurality of queries associated with each cursor designated as a persistent cursor utilizing said persistent cursor table following said commit operation wherein portions of an application specified sequence of objects may be processed between frequent commit operations, permitting portions for which processing is complete to be accessed by other users.

2. The method in a data processing system for enhanced efficiency in concurrent user database applications which process application specified sequences of objects according to claim 1 further including the step of storing within said persistent cursor table a state of selected scans and any intermediate results associated with each persistent cursor in response to a commit operation.

3. A data processing system for enhanced efficiency in concurrent use database applications which process application specified sequences of objects by utilizing a plurality of queries which each specify a set of objects and a named cursor associated with each of said plurality of queries, each of said named cursors including at least one scan which may be utilized to evacuate and enumerate an associated query, said data processing system comprising:

means for permitting a user to designate within said data processing system at least one of said named cursors as a persistent cursor;

means for storing a status of each persistent cursor in a persistent cursor table within said data processing system along with a state of any included scan and a query evaluation state in response to a commit operation within said data processing system;

means for closing all cursors in response to said commit operation within said data processing system; and means for reestablishing a plurality of queries associated with each cursor designated as a persistent cursor utilizing said persistent cursor table following said commit operation wherein portions of an application specified sequence of objects may be processed between frequent commit operations, permitting portions for which processing is complete to be accessed by other users.

4. The data processing system for enhanced efficiency in concurrent use database applications which process application specified sequences of objects according to claim 3 further including means for storing within said persistent cursor table a state of selected scans and any intermediate results associated with each persistent cursor in response to a commit operation.

* * * * *

UNITED STATES PATENT AND TRADEMARK OFFICE
CERTIFICATE OF CORRECTION

PATENT NO. : 5,220,665

DATED : June 15, 1993

INVENTOR(S) : Dan J. Coyle, Jr., Bruce G. Lindsay

It is certified that error appears in the above-identified patent and that said Letters Patent is hereby corrected as shown below:

Col. 4, line 36, please delete "56" and insert --58--; and
Col. 4, line 47, delete "$6" and insert --56--.

Col. 6, line 43, please insert after "block" --116--.

Col. 8, line 14, please insert after "block" --160--.

Signed and Sealed this

Eighteenth Day of January, 1994

Attest:

BRUCE LEHMAN

Attesting Officer    Commissioner of Patents and Trademarks